United States Patent Office 3,489,695
Patented Jan. 13, 1970

3,489,695
SUBSTITUTED IMIDAZOLES FOR CURING
EPOXY RESINS
Harold A. Green, Havertown, Pa., assignor to Air Products and Chemicals, Inc., Philadelphia, Pa., a corporation of Delaware
No Drawing. Continuation-in-part of application Ser. No. 111,485, May 22, 1961. This application June 17, 1964, Ser. No. 375,959
Int. Cl. C08f 30/14
U.S. Cl. 260—2       5 Claims This application is a continuation-in-part of Ser. No. 111,485, filed May 22, 1961, now abandoned.

This invention is directed to methods of curing epoxy resins and compositions effective as curing agents.

In recent years epoxy resins, i.e., the resinous or resin-forming materials which contain one or more epoxide or oxirane group, have come into broad commercial use. While glycidyl ether resins, produced by reacting polyhydroxyl compounds with epichlorohydrin, have been the most prominent members designated by the expression "epoxy resin," significant development has occurred in the utilization of epoxidized olefins, including cycloaliphatic epoxides, which are formed by the addition of oxygen to the double bond to form the three membered epoxide ring.

Epoxy resins are particularly valued for their ability to remain liquid for a long period of time (have long shelf life) yet be readily convertible upon hardening to materials suitable for use in applications such as filament winding, laminating, electrical insulation, coatings and adhesives. This hardening is obtained by the addition of chemically active curing or hardening agents. Two general types of reactions are involved in producing useful end porducts: (1) cross-linking or coupling reactions including esterification and etherification, and (2) catalytic polymerization reactions—predominantly polymerization through epoxy groups. For both conventional epoxy resins and epoxidized olefins the cross-linking reactions generally require stoichiometric or near stoichiometric amounts of co-reacting hardening agents while catalytic polymerization involves considerably less than stoichiometric amounts of appropriate hardening agents.

Among the best known and most active curing agents are certain primary and secondary amines, which act by effecting cross-linking between essentially linear polymeric elements and secondary amines, which act as condensation catalysts. For example, diglycidyl ether of bis-phenol:

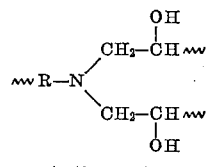

or its linear polymer—

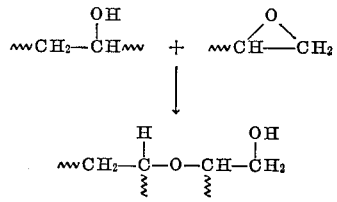

where $x$ has an average value varying from around one to about ten, has reactive epoxy end groups and hydroxy elements to combine with amine—

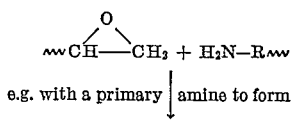

e.g. with a primary amine to form (a)        H   OH
         |   |
    ∼∼R—N—CH₂—CH∼∼ a secondary amine and further to form

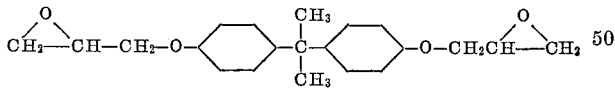

a tertiary amine— with each active hydrogen attached to —N reactive with an epoxy or OH group to effect cross-linking. Finally, hydroxyls in the formula on col. 1, line 55 and below may also react with epoxies to form ether cross-linkages—

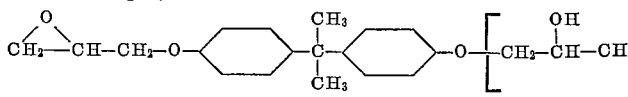

The reactions for a typical anhydride system are illustrated below:

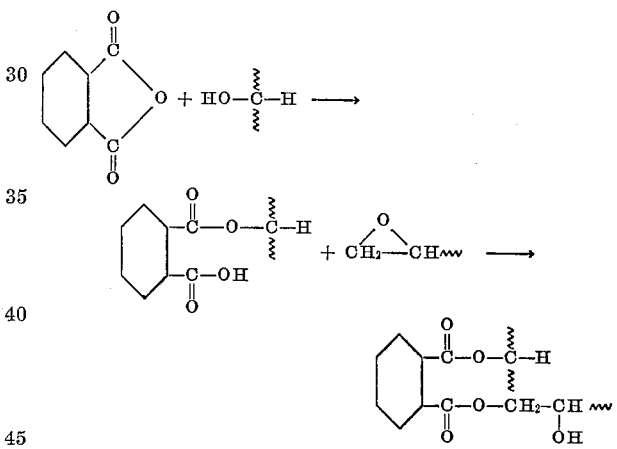

Finally, systems involving polymerization through epoxy groups are illustrated by the following reactions.

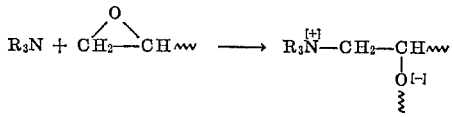

and then

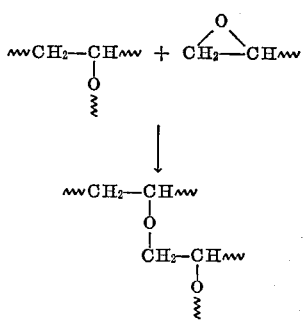

In view of the complexity of the reactions involved in the formation of hard, infusible resins, even when put on a model monofunctional basis, it is readily appreciated that the hardening or curing process is not subject to detailed analysis, but is more understandably practiced on an empirical basis with the physical and chemical characteristics of the hardened products as the criteria of curing. Furthermore, not only is the curing agent of consequence in determining the character of the hardened resin, but also the rate of curing as a function of time and temperature, the presence of interfering (acidic) impurities in the resin and the concentration and ratio of phenolic, hydroxy and epoxy reactants.

Primary and polyfunctional aliphatic amines were among the first and most effective epoxy curing agents. Such compounds as diethylene triamine (DETA) have been highly favored in structural applications because they were found to be both effective and available at relatively low cost. For other applications DETA is entirely unsuitable. For example, a curing agent functionality of less than three is necessary to achieve the high elongations needed in sealant applications. Nevertheless, DETA and related aliphatic polyamines remain among the most broadly used curing agents.

Diethylenetriamine, $H_2N—C_2H_4—NH—C_2H_4—NH_2$, has 5 replaceable hydrogens per mole available for cross linking. With a molecular weight of 103, 21 parts of DETA will be equivalent to one reactive epoxy group, or for an epoxy resin of 400 molecular weight (200 epoxide equivalent), 10 to 11 parts of DETA will be required stoichiometrically per 100 parts of epoxy resin. The use of the indicated stoichiometric amount of reactive amine will generally give nearly optimum properties in the cured resin. However, very active polyfunctional amines, such as DETA, tend to effect cross-linking at the expense of chain building, resulting in brittle resins. On the other hand, less than the equivalent amount of cross-linking agent will fail to produce an overall adequate cure. Thus, the concentration of curing agent of the active cross-linking type is necessarily limited to a narrow concentration range and within this concentration range the shelf life or pot life of the epoxy mix is very short indeed, e.g., 20 minutes in pound batches to 40 minutes in $\frac{1}{10}$ pound batches. Conventionally, the mix is held at ordinary temperatures after the mix gels and sets hard, e.g., 24 hours at 40° C., or at higher temperatures for a shorter time, e.g., 10 hours of 120° C., to develop the physical characteristics (hardness, tensile strength or resistance to distortion when heated) desired. An important advance in the art of epoxy curing would result with a curing agent which would have very low activity in an epoxy mix at ordinary temperatures so that the mix would have a reasonably long shelf life or pot life, but would be rapidly converted to a reactive, quick setting mix on being activated by readily available means such as activation in a thin film with air, water or alcohol.

Acordingly, an object of the present invention is the formulation of an epoxy curing agent which is relatively inert at ordinary temperatures and which results in an epoxy mix having a pot life of 12 or more hours.

Another object is in having such a curing agent readily activatable to produce rapid curing of the epoxy mix under suitable activating conditions.

A further object of the invention is the development of resin mixes containing curing agent which are stable and non-gelling at ordinary working conditions over a period of at least one working day, but which are autogenically and rapidly cured upon internal or external activation.

Still another object of the invention is the formulation of an epoxy resin curing composition which has a balanced action, being spontaneously though moderately reactive at ordinary temperatures so as to give the mix a practical pot life and further reactive upon activation to produce a hard autogenically cured resin.

In accordance with the present invention it is possible to effect the curing of epoxy resins with a quantity of curing agent adequate to obtain thorough curing while controlling the composition of the curing agent to obtain: (a) a satisfactory pot life, of the order of 12 to 36 hours or more and (b) a controlled condensation reaction with the formation of a hard resin having a high heat-deflection temperature.

In particular, it has been discovered that certain compositions comprising imidazole and imidazole derivatives which are relatively inert under ordinary conditions are uniquely effective and extremely active in curing epoxy resins when activated by appropriate means. In the application of such curing agents the uncured epoxy resin is mixed with the curing agent at ordinary temperatures in an effective concentration, which unexpectedly may be less than stoichiometric amounts, and the mix remains unreacted and ungelled for a substantial period of time, i.e., has a relatively long pot or shelf life. However, when this mixture is activated by (1) external heating to effect thermal activation, (2) an accompanying energizing reaction such as exothermic cross-linking initiated by an aliphatic amine or anhydride or (3) the presence of an accelerator, such as in certain instances water, the cross-linking or curing reaction is rapidly accelerated with the formation of a hard, cured resin.

Unique advantages of the invention are:

(1) In using imidazoles in conjunction with a conventional aliphatic amine curing agent, such as DETA, the mix remains ungelled at room temperature for 12 hours or more, giving the operator immensely greater flexibility in his use of the epoxy mix, (2) In using combinations such as DETA and imidazoles an overall lesser quantity of curing agent is effective in obtaining ultimate curing with no recognizable degradation in physical properties of the cured resin, (3) In using imidazoles in combination with anhydrides, such as hexahydrophthalic anhydride, better product qualities are obtained than with the tertiary amine accelerators heretofore employed, and (4) In using imidazoles alone or in the several named combinations, both the pre-gelling pot life and the cross-linking and hardening rate are controllable to give maximum flexibility in operation and optimum physical properties of the cured resins.

When diethylene triamine (DETA) is used alone as a curing agent for an epoxy resin of 200 epoxide equivalence, approximately 11 parts of curing agent per hundred of resin (phr.) effect a stoichiometric cure (essentially complete cross-linking), giving a self-cured resin having an optimum strength as measured by the heat deflection test (HDT), as described below:

EXAMPLE I

The epoxy resin of this example was a diglycidylether of bis-phenol A having a viscosity of 150 to 225 cps. at 25° C. and an epoxide equivalent of 230 to 280. The resin was liquid and had a color, 25° C. (Gardner), of 9 max.

TABLE 1

| DETA (phr.) | Product character [1] | HDT at 264 p.s.i. (° C.) .01″ |
|---|---|---|
| 5 | Gel | Uncured |
| 9 | Hard self-cured resin | 85 |
| 10 | do | 102 |
| 11 | do | [2] 116 |
| 12 | do | 95 |

[1] 24 hours at room temperature.
[2] Optimum.

Less or more than the chemically equivalent amount of DETA does not produce the optimum strength in cured resin and, while DETA behaves as expected chemically here, its performance is far from ideal in the light of accompanying operational factors. As noted above, the stoichiometric mix of DETA and uncured resin reacts very rapidly at room temperature, so that the mix has a pot life of from about 20 to not more than 60 minutes even in small batches. Such short pot life, i.e., short working time, is unsatisfactory for most commercial installations particularly where custom casting or molding of epoxy resins is carried out. Moreover, the epoxy-DETA reaction is vigorous, yielding a high exotherm which must be controlled to avoid either burning the resin or volatilizing a part of the DETA added. It has therefore become a matter of industrial importance to modify the action of such curing agents so as to give a controlled and thorough cure after a reasonably long shop time (pot life) to permit the proper handling of the resin mix. Some operators have done this by cutting down on the amount of DETA used. However, as shown in the above table, this gives a resin which is not fully cured and has lower strength.

A standard method in measuring the effectiveness of curing agents in building up structural strength in a resin is the "heat deflection temperature" (HDT) test. This is determined by ASTM Procedure D648–56 in which a preformed standard resin bar, after being cured 8 hours at 100° C., is suspended at each end and loaded in the middle with a weight to give uniform fiber stress of 264 p.s.i. The sample on test is then immersed in a temperature controlled hot oil bath equipped with a deflection measuring indicator. This bath is heated at a rate of 2° C./minute and the temperature of the bath when the sample under pressure is deflected 0.01 inch is the "heat deflection temperature." In like manner, the bath temperature for samples deflected 0.02 inch, 0.03 inch, 0.05 inch, etc. under pressure may be determined.

In the preparation of cured epoxy resins suitable for testing, the curing agent was blended with the uncured epoxy resin. The curing agent was employed in an appropriate amount such as in a range of concentration from 0.25 to 100 parts or more of the uncured resin. When the curing agent comprised or consisted of an imidazole, the imidazole was employed in an amount preferably within the range of 0.25 to 15 parts of imidazole per 100 parts of uncured resin. The mix was then allowed to cure over a period of time at room temperature, or subjected to accelerated curing at advanced temperatures and times. In the tests referred to herein, unless specified otherwise, all of the samples of the reacted epoxy resin and curing agent were subjected to a uniform cure of 8 hours at 100° C. before being subjected to the heat deflection test.

Unexpectedly, it has been found that an effective and balanced curing action is obtained by the use of a lesser quantity of DETA in combination with a small amount of an imidazole as a combined curing agent, which combination is relatively inert at ordinary temperatures in the concentration used, but is activatable by external heating or by participating in an accompanying energizing reaction. This is illustrated by the following example which employs DETA and 2-methyl-imidazole (MI) to cure the epoxy resin of Example I.

EXAMPLE II
TABLE 2

| Curing agent (phr.) | | | | | |
|---|---|---|---|---|---|
| DETA | 5 | 10 | 5 | 3 | 3. |
| MI | 0 | 0 | 1 | 2 | 1.5. |
| Product description 24 hrs. at room temp. | Gel | Hard, self-cured. | Hard self-cured. | Hard self-cured. | Gel. |
| HDT at 264 p.s.i. (°C.) .01". | Uncured | 115–120 | 118 | 93 | Uncured. |

The unusual effectiveness of 2-methyl-imidazole is noteworthy in that 1 part of the imidazole is apparently equivalent to about 5 parts of DETA without loss in resin strength. It can be seen that the imidazole is an extremely unique promoter, probably due to its secondary and/or tertiary amino-groups which are extremely effective when activated.

It has been found that this combination is effective over a broader time and temperature range, to give a fully cured, strong resin having a high heat deflection temperature with substantially less curing agent than would otherwise be required if the curing agent were an alkylene diamine alone.

EXAMPLE III

Table 3 illustrates the use of DETA and 2-ethyl-4-methyl imidazole (EMI) as curing agents for DER 331, a bis-phenol A-diglycidyl ether resin having an epoxide equivalent weight of 186–192, a viscosity of 11–16×10³ cps. at 25° C. and a specific gravity of 1.16. The temperature of the epoxy mix was maintained at 40° C. until the resin system gelled and then post-cured 48 hours at 93° C.

TABLE 3

| DETA (phr.) | EMI (phr.) | HDT at 264 p.s.i. (° C.) .01" |
|---|---|---|
| 8 | -- | 104 |
| 7 | 1 | 123 |
| 4 | 4 | 139 |
| -- | 5 | 128 |

This unique action of imidazoles has been further demonstrated with related substituted imidazoles when acting alone. In Example IV the epoxy resin of Example I was mixed with 10 phr. of various substituted imidazoles and activation was effected by external heating at 80° C. The epoxy resin-imidazole mix was reacted over 12 hours.

EXAMPLE IV
TABLE 4

| Curing agent | Product description | HDT at 264 p.s.i. (° C.) .01" |
|---|---|---|
| 1-hydroxyethyl-2-methyl-imidazole | Hard resin | 88 |
| 2-ethyl-imidazole | do | 110 |
| 2,4-dimethyl-imidazole | do | 119 |
| 1,2-dimethyl-imidazole | do | 112 |

Epoxy resin curing compounds which have been found particularly effective include imidazole and substituted imidazoles having the generic formula

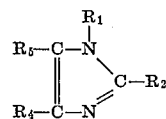

where R₂, R₄ and R₅ are independently selected from:

alkyl radicals of 1 to 19 carbon atoms,
aryl radicals of 6 to 14 carbon atoms (e.g., phenyl, naphthyl, etc.)
aralkyl radicals of 7 to 16 carbon atoms (e.g., benzyl, naphthalyl, etc.) and
hydrogen and where R₁ is selected from:
alkyl radicals of 1 to 6 carbon atoms,
amino alkyl radicals of 1 to 6 carbon atoms,
hydroxyalkyl radicals of 1 to 6 carbon atoms
and hydrogen, and at least one but not more than two R's are hydrogen.

Specifically, compounds having a substituent "R" in the 2,4 and/or 5 position, include such substances as—

(a) Alkyl radicals of 1 to 19 carbon atoms, such as:

2-methyl-imidazole
2-ethyl-imidazole
2-ethyl-4-methyl-imidazole
2-methyl-4-n.butyl-imidazole
2-dodecyl-5-methyl-imidazole
2,4,5-trimethyl-imidazole (b) Aryl hydrocarbon radicals of 6 to 14 carbon atoms, such as:

2-phenyl-imidazole
2-phenyl-4-methyl-imidazole
2,5-diphenyl-imidazole (c) Aralkyl hydrocarbon radicals, of 7 to 16 carbon atoms, such as:

2-benzyl-imidazole
2-phenethyl-imidazole

These compounds having a substituent "R" in the 1-position include such substances as—

(a) Alkyl radicals of 1 to 6 carbon atoms, such as:

1-methyl-imidazole
1,2-dimethyl-imidazole
1-butyl-2-methyl-imidazole (b) Hydroxy-alkyl radicals of 1 to 6 carbon atoms, such as:

1-(2-hydroxyethyl)-imidazole
1-(2-hydroxyethyl)-2-methyl-imidazole
1-(3-hydroxypropyl)-2-methyl-imidazole
1-(2-hydroxyethyl)-2-hexyl-imidazole (c) Amino-alkyl radicals of 1 to 6 carbon atoms, such as:

1-(2-aminoethyl)-2-methyl-imidazole
1-(2-aminopropyl)-2-methyl-imidazole
1-(4-aminobutyl)-2-phenyl-imidazole

EXAMPLE V

Five weight percent of compound 2-heptadecyl-4-methyl imidazole was mixed with Epon 828, an epoxy resin prepared by reacting epichlorohydrin and bis-phenol A having an epoxide equivalent weight of 185–192 and a viscosity (25° C.) of 100–160 poises, and heated at 70° C. until the mix gelled (80 minutes). The resin was then subjected to a post-cure of 48 hours of 93° C. The HDT at 264 p.s.i. (.01") for the cured resin was 121° C.

EXAMPLE VI

Benzyldimethylamine (BDMA) is one of the most accepted commercial epoxy resin curing agents for elevated temperature curing. Table 5 compares BDMA with 2-ethyl-4-methyl imidazole (EMI) for the curing of Epon 828, an epoxy resin prepared by the reaction of epichlorohydrin and bis-phenol A, which has a viscosity of 5 to 15×10³ cps. at 25° C. and an epoxide equivalent, i.e., grams of resin containing one gram-equivalent of epoxide, of 185 to 192. In Table 6 BDMA is compared with EMI and 2-methyl imidazole (MI) for the curing of Oxiron 2000, an epoxy resin produced by the peracetic acid epoxidation of polybutadiene having a sp. gr. 1.010 (20° C.), an epoxy equivalent of 177 and viscosity (25° C.) of 1800 poises. Accelerator concentration for each comparison was 3% by weight. An anhydride co-reactant, hexahydrophthalic anhydride, was added to the epoxy resin system employed in Table 6 to provide an epoxy resin:anhydride weight ratio of 1.0:0.64. The benzoyl peroxide which is present cross-links unepoxidized unsaturates remaining in the Oxiron resin. A post-cure of approximately two days in a 200° F. oven was employed to treat the product of each run set forth in Tables 5 and 6.

TABLE 5

| Accelerator | Bath temp. (°C.) | Time-temp. maximum (minutes) | HDT at 264 p.s.i. (°C.) | | |
|---|---|---|---|---|---|
| | | | .005" | .01" | .03" |
| EMI | 75 | 32.0 | 135 | 141 | 152 |
| EMI | 90 | 13.5 | 121 | 128 | 143 |
| BDMA | 75 | 47.0 | 116 | 117 | 119 |
| BDMA | 90 | 36.0 | 104 | 105 | 107 |

TABLE 6

| Accelerator | Reaction temp. (°C.) | Benzoyl peroxide Wt. percent | Time-temp. max. (min.) | HDT, 264 p.s.i. (°C.) | | |
|---|---|---|---|---|---|---|
| | | | | .005" | .01" | .03" |
| EMI | 100 | 1 | 36.0 | 123 | 130 | 138 |
| MI | 100 | 1 | 24.5 | 128 | 139 | 155 |
| BDMA | 100 | 1 | 40.0 | 97 | 104 | 114 |

The Heat Distortion Temperature (HDT) data of Tables 5 and 6 are quite significant since HDT is the single characteristic which has been found most useful in the art for evaluating cured epoxies. As seen from Tables 5 and 6, the HDT for imidazole cured epoxy resins is substantially greater than the HDT of BDMA cured epoxy resins.

The effectiveness of these compounds as epoxy curing agents lies not only in the longer pot life of epoxy-catalyst mixes but also in the equivalent tack-free drying time at ordinary temperatures when used as thin film coating compositions.

EXAMPLE VII

Thin film coating formulations were prepared by mixing an epoxy resin of the Shell Chemical Type XA–200 with the curing agents shown in Table 7. Epoxy resins of the type employed may be prepared by mixing 467 grams of a diglycidyl ether of bisphenol having a melting point (Durran's mercury method) of 65 to 75° C., and an epoxide equivalent of 450 to 550; about 104 grams of methyl isobutyl ketone; about 104 grams of xylene; about 104 grams of ethylene glycol monomethyl ether and about 24 grams of unmodified urea-formaldehyde.

The use of substituted imidazoles in the prepared coating formulations was effective not only in extending the pot life of the formulations including DETA but accomplished this end with no evident increase in drying time.

TABLE 7

| Total | Curing agents (phr.) | | Pot life, room temp., hours ungelled | Drying time, 70–80° F.- hours to tack free dryness |
|---|---|---|---|---|
| | DETA | 2-methyl-imidazole | | |
| 6.00 | 6.0 | 0.00 | 16 | ~6 |
| 3.64 | 3.0 | 0.64 | 40 | ~6 |
| 2.85 | 2.0 | 0.85 | 52+ | ~6 |
| 2.40 | 1.3 | 1.10 | 120+ | ~6 |
| 1.30 | 0.0 | 1.30 | ~240 | ~24 |

Increasing quantities of 2-methyl-imidazole in combination with decreasing quantities of DETA extended the shelf life sharply up to a ratio of about 1 part of imidazole per part of DETA while having no adverse effect on the tack-free drying time of a thin film. Also an overall substantial decrease in the total amount of cross-linking agents was notable as having no adverse effect on drying time. Furthermore, each part of 2-methyl-imidazole replaced approximately 4.6 parts of DETA with no adverse effect on final drying of a thin film, while simultaneously increasing the pot life or shelf life of the epoxy mix.

When the quantity of curing agent was reduced to 1.3 phr. of DETA and 1.1 phr. of 2-methyl-imidazole, the massive mix remained ungelled for over 120 hours. This same DETA-2-methyl-imidazole composition was as effective as 6.0 parts of DETA alone in ultimate drying, while simultaneously multiplying the shelf life of the mix over 7.5 times. Finally, 2-methyl-imidazole was extremely slow acting when used at 1.3 phr. alone, forming no gel in over 10 days in the massive epoxy mix and requiring about 24 hours at 70–80° F. curing of a thin film to tack-free condition.

This effect was not observed in casting formulations but only in thin film coating applications. Since, under these conditions exothermic heat from condensation is readily dissipated with the coating composition remaining at the prevailing temperature—especially in coating compositions containing volatile solvents such as xylene, diisobutyl ketone or methyl Cellosolve, one cannot readily attribute activation of the DETA-imidazole curing system to internal or external heating. This autogenic curing of thin film formulations was an anomaly which was generally thought to be associated with the activating effect of air (oxygen) or moisture (water) on the epoxy-curing system film. A recent publication by Gough and Smith [1] confirms this hypothesis, showing that water is a powerful accelerator of amine agents in epoxy resin curing. As the water content in a curing agent-epoxy mix was increased, a peak exotherm and a minimum gel time was obtained, beyond which the exotherm fell, due probably to the removal of heat by vaporization of excess water. It is thus quite clear that in surface coatings where the thin film of epoxy resin and curing agent remains exposed to the atmosphere at essentially constant temperature, water present as such or as moisture in the air is an effective activator.

Coating compositions of the type described above have specific applications wherein they are exposed to the action of solvents such as water, caustic solutions and the like. Accordingly, a measure of the solvent resistance of such coatings is important in characterizing the coating resin. In each case a coupon of cold rolled steel was cleaned, dried, coated with a thin film of the resin mix and cured by room temperature exposure for 7 days. In the water test the sample was immersed in water at room temperature at about a 2-inch depth, then removed at intervals and tested. If a scratch with the fingernail leaves an indentation but does not break the film, the film is "softened." If the fingernail test breaks the film or if the film is blistered and not intact, it has "failed." The 20% caustic test is similar.

TABLE 8

| Curing agent (phr.) | | | | |
|---|---|---|---|---|
| DETA | 2-methyl-imidazole | Water | | 20% caustic |
| 6 | 0 | OK, 7 days | | OK, 7 days. |
| 3 | 0.64 | do | | Do. |
| 2 | 0.85 | do | | Do. |

The coatings formed with a notably lesser quantity of the 2-methyl-imidazole-DETA combination were fully as resistant to softening or blistering by water or caustic solution as the coating cured with 6 phr. of DETA alone at the test conditions.

Epoxy resin films cured with DETA and imidazoles exhibit effective resistance to other solvents as well, even such active materials as methyl isobutyl ketone. A resin cured with 3 phr. of DETA and 0.64 phr. of 2-methyl-imidazole showed only slight softening after 2.5 hours of contact with a cotton swab saturated with methyl isobutyl ketone.

[1] Journal of the Oil & Color Chemists Assn., June 1960, pp. 409–417.

EXAMPLE VIII

Two properties of major importance in the commercialization of epoxy curing agents are (1) the ease with which they may be blended with epoxy resins and (2) the length of the pot life or shelf life of the epoxy mix.

Since 2-ethyl-4-methyl imidazole (EMI) is a liquid it can be easily blended with epoxy resins. Metaphenylene-diamine (MPA) and 4,4'-methylene dianiline (MDA) on the other hand are solids at room temperature and must be heated to obtain a homogeneous mixture with any epoxy resin.

Tables 9 and 10 compare the pot life of EMI with diethylenetriamine (DETA), MDA and MPA in Epon 828 resin mixtures.

TABLE 9

| Curing agent | Phr. | Two-day post cure (° C.) | Pot Life at 30° C. | HDT at 264 p.s.i. .01" (° C.) |
|---|---|---|---|---|
| EMI | 0.25 | 204 | >>72 hours | 138 |
| EMI | 1 | 204 | >72 hours | 188 |
| EMI | 1 | 93 | >72 hours | 107 |
| DETA | 8 | 93 | <2 hours | 104 |

TABLE 10

| Curing Agent | Phr. | Pot life at 80° C. (post-cure 93° C., 2 days) | HDT at 264 p.s.i. (° C.) .01" |
|---|---|---|---|
| EMI | 3 | 36 hours | 132 |
| EMI | 5 | 24 hours | 142 |
| MDA | 28 | <1 hour | 130 |
| MPA | 14 | 6 hours max | 139 |

These properties evidence high crosslinking and are particularly valuable, partly because of the long pot life, in applications such as filament winding.

EXAMPLE IX

Epoxy-novolak resins, when cured, combine the excellent thermal stability of the phenolic plastic with the versatility and reactivity of epoxies, through the following general structure:

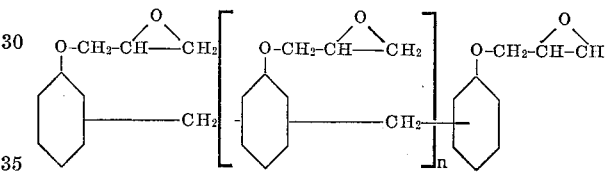

where $n$ has an average value varying from 1 to 10.

It has been found that the aforementioned imidazole compounds are extremely effective curing agents for epoxy-novolak type resins. The following table compares the effect of 2-ethyl-4-methyl imidazole (EMI), benzyl dimethyl amine (BDMA) and tri(dimethyl amino-methyl)-phenol (DMP) as curing agents for D.E.N. 438 epoxy-novolak resin which has an average value for $n$ of 1.6, an epoxide weight equivalent of 175 to 182 and a viscosity of $30$–$90 \times 10^3$ cps. at 125° F.

TABLE 11

Curing Agent concentration: 3% by weight
Temperature: 90° C.
Post-cure: 200° F.—2 days

| Curing agent | Activity (min.) | HDT (264 p.s.i.) (° C.) | | |
|---|---|---|---|---|
| | | .01" | .02" | .05" |
| EMI | 11.5 | 169 | [1] >260 | |
| BDMA | 19.0 | 120 | 121 | 123 |
| DMP | 16.0 | 117 | 119 | 123 |

[1] 260° centigrade is the upper limit of the test.

Table 12 demonstrates EMI is an effective curing agent for the curing of dibasic anhydride-epoxy-novolak formulations. The epoxy-novolak resin for the following runs was identical with that of Table 11.

TABLE 12

Anhydride—Resin at 1:1 equivalent ratio
Curing Agent concentration: 3% by weight
Cure Temperature: 80° C.
Post-Cure Conditions: 2 days at 200° F.

| Anhydride | Curing Agent | Activity (min.) | HDT (264 p.s.i.) (° C.) | | |
|---|---|---|---|---|---|
| | | | .01" | .03" | .05" |
| Nadic methyl anhydride [1] | EMI | 23.5 | 147 | 166 | 176 |
| Do | BDMA | 15.0 | 130 | 134 | 137 |
| Do | DMP | 19.0 | 136 | 144 | 148 |
| Hexahydrophthalic anhydride | EMI | 13.0 | 164 | 175 | 180 |
| Do | BDMA | 5.5 | 132 | 137 | 140 |
| Do | DMP | 5.0 | 141 | 151 | 155 |

[1] Methylbicyclo [2.2.1] heptene-2,3-dicarboxylic anhydride.

While considerable emphasis in the examples has been placed on the high order of effectiveness of certain imidazole compounds for the curing of epoxy resins when used either alone or in various combinations, the relatively low order of toxicity of the aforementioned imidazole compounds is a factor which is of considerable importance in the trade. Aliphatic amines are skin irritants. They can cause dermatitis; further, they are capable of sensitizing some individuals so that even very brief exposure becomes toxic. Edema or even necrosis may result. Aromatic amines, while less irritating to the skin and less prone to cause skin sensitization responses, present a very serious hazard if acquired internally. Anhydride curing agents are considered capable of causing severe eye and skin irritation, even burns, depending upon the severity of contact. Thus, the low volatility and low order of dermal and oral toxicity of the aforementioned imidazole compounds, particularly when employed as the sole curing agent, are distinct advantages over many of the commonly employed epoxy curing agents.

It is to be understood that conventional fillers, plasticizers, accelerators, diluents and solvents may be added to the epoxy resin formulations set forth herein. In addition the epoxy resin formulations may be mixed with other epoxides to increase flexibility, impact resistance and elongation.

Obviously, many modifications and variations of the invention as hereinbefore set forth may be made without departing from the spirit and scope thereof and therefore only such limitations shall be imposed as are indicated in the appended claims.

What is claimed is:

1. The coating composition comprising an uncured epoxy resin selected from the group consisting of a cycloaliphatic epoxide resin wherein the epoxide is an oxirane group and a polyglycidyl ether of a polyhydric phenol and a curing agent comprising 2-ethyl-4-methyl-imidazole in a ratio of from 0.25-15 parts of imidazole per 100 parts of resin, said composition having a tack-free drying time of less than 10 hours under atmospheric conditions when in thin coating films.

2. The coating composition comprising an uncured epoxy resin selected from the group consisting of a cycloaliphatic epoxide resin wherein the epoxide is an oxirane group and a polyglycidyl ether of a polyhydric phenol, and a curing agent consisting of a mixture of an aliphatic polyamine and an imidazole, said imidazole being present in the ratio of from 0.25 to 15 parts of imidazole per 100 parts of epoxy resin, wherein the imidazole is a composition of the general formula:

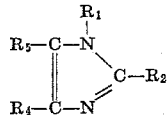

where $R_1$, $R_2$, $R_4$, and $R_5$ are independently selected from the group consisting of hydrogen and alkyl radicals of 1 to 6 carbon atoms, and at least one but not more than two R's are hydrogen.

3. The coating composition of claim 2 wherein the imidazole is 2-ethyl-4-methyl-imidazole.

4. An epoxy resin composition capable of being cured comprising an epoxy resin selected from the group consisting of a cycloaliphatic exposide resin wherein the epoxide is an oxirane group and a polyglycidyl ether of a polyhydric phenol and a minor amount of 2-ethyl-4-methylimidazole.

5. An epoxy resin composition capable of being cured comprising polyglycidyl ether of a polyhydric phenol and a minor amount of 2-ethyl-4-methyl-imidazole.

References Cited

UNITED STATES PATENTS

| | | |
|---|---|---|
| 3,394,105 | 7/1968 | Christie. |
| 2,768,153 | 10/1956 | Shokal. |
| 2,994,685 | 8/1961 | Delmonte et al. |
| 3,030,376 | 4/1962 | Liggett et al. |

OTHER REFERENCES

Houdry Process Corp., Preliminary Data Bulletin, "Imidazoles,' Apr. 8, 1959, 11 pages, 260–309.

Lee et al., "Epoxy Resins," p. 15 relied on, McGraw-Hill Book Co., Inc., New York, 1957.

WILLIAM H. SHORT, Primary Examiner

T. PERTILLA, Assistant Examiner

U.S. Cl. X.R.

117—161; 260—47, 59

PO-1050
(5/69)

UNITED STATES PATENT OFFICE
CERTIFICATE OF CORRECTION

Patent No. 3,489,695          Dated January 13, 1970

Inventor(s) Harold A. Green

It is certified that error appears in the above-identified patent and that said Letters Patent are hereby corrected as shown below:

Column 1, line 34, "porducts" should read --products--.

Column 3, line 56, "acordingly" should read --accordingly--.

Column 7, line 21, "R" should read --$R_1$--.

Column 8, line 49, table 7, last heading, "tacks" should read --tack--.

Column 10, line 30, formula, the last "CH" should read --$CH_2$--.

Column 12, line 19, "exposide" should read --epoxide--.

SIGNED AND
SEALED

JUN 16 1970

(SEAL)
Attest:

Edward M. Fletcher, Jr.
Attesting Officer

WILLIAM E. SCHUYLER, J
Commissioner of Patent